Jan. 15, 1935. C. A. BROWN 1,987,988
FLUID LEVEL AND PRESSURE INDICATING SYSTEM
Filed Jan. 2, 1926
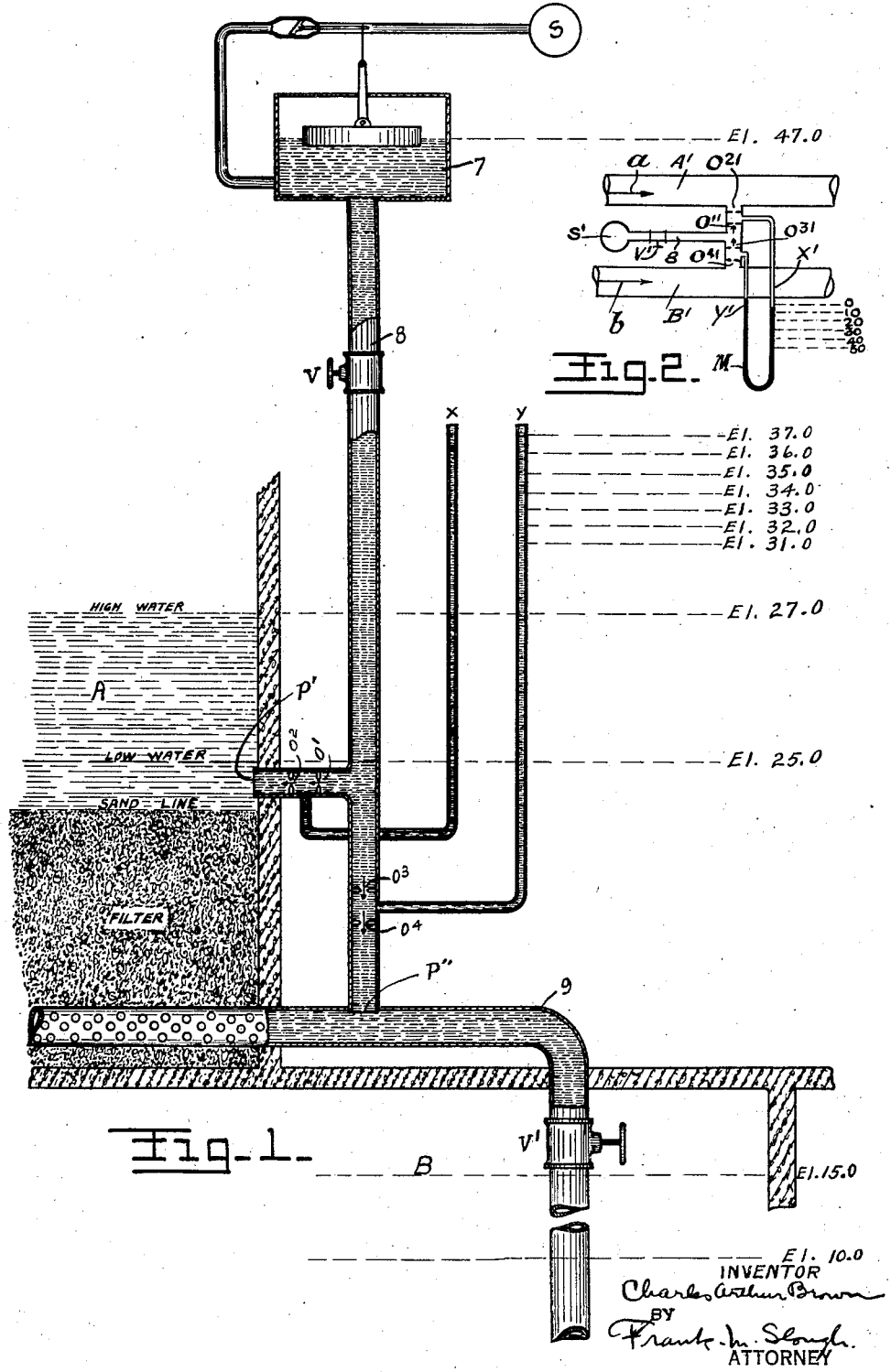

Patented Jan. 15, 1935

1,987,988

UNITED STATES PATENT OFFICE 1,987,988

FLUID LEVEL AND PRESSURE INDICATING SYSTEM

Charles Arthur Brown, Lorain, Ohio, assignor of one-half to George G. Earl, New Orleans, La.

Application January 2, 1926, Serial No. 78,812

16 Claims. (Cl. 73—167)

My invention relates to fluid level and pressure indicating means, and more particularly to means adapted to indicate quantitatively the relative levels or pressures of fluids, including pressures of gaseous fluids, occurring above, at or below the point of desired observation. The past practice has been to indicate such levels or pressures by different types of gauges. For liquids the simplest practice has been to operate a float on the liquid level and carry a cord over pulleys to a weight placed in front of a telltale, the position of the weight indicating the level of the tank. Where there have been two or more tanks having varying liquid levels, two or more telltales have been employed, the difference in the levels being obtained by noting the difference in the telltale readings.

More pretentious devices employ differential gears operated from the floats, the difference in levels being read directly from a pointer or hand, operated by the differential gears. In others the levels may be indicated by a hand which is operated by a Bourdon spring, the spring being acted on by the pressure in the tank or reservoir of pressure. In certain cases partial vacuums have been employed, operating on springs of the Bourdon type or on mercury columns.

All of the above devices are more or less satisfactory for certain purposes, but all of them are possessed of disadvantages and are of limited utility. My present invention aims to overcome such difficulties, and is of more extended utility in meeting a greater variety of needs than the means which have been used in the past.

An object of my invention is to provide improved means to enable an observer to read one or more fluid levels or pressures, which may be variable, in one or more reservoirs or fluid containers, such reservoirs or containers being located at an elevation either above or below the point of observation.

It is a further object of my invention to provide improved means capable of indicating liquid levels and also liquid pressures, and which may be adaptable for use as well for indicating all levels or pressures of fluids, including pressures of gaseous fluids, occurring above, at, or below the point of desired observation.

It is a further object of my invention to accomplish the aforesaid objects in an indicating means which will be devoid of mechanically moving parts, which I find are very unreliable in practice, and of limited utility in commercial use.

My invention will be better understood by reference to the drawing, which is a part of this specification, and which drawing shows an elevational view of an embodiment of my invention, certain of the parts being illustrated in section or diagrammatically, for the purpose of a ready, convenient and understandable disclosure of my invention.

In the drawing, Fig. 1 illustrates a first embodiment of my invention;

Fig. 2 illustrates a second embodiment of my invention.

Referring now first to the first embodiment of my invention illustrated in Fig. 1 of the drawing, I show a portion of a filter tank, A, with a clear well, B, below the filter tank. A constant level tank, 7, supplies flow for a conduit, 8, a valve V serving to shut off flow from the source of constant level tank, 7.

Orifices, $O^1$ and $O^2$, are located in the horizontal branch of the conduit, 8, the discharge from orifice $O^2$ entering the filter tank above the "sand line" but below the point of "low water" level in the filter tank at El. 25.0 feet. The point of "high water" level in the filter tank is shown at El. 27.0 feet, the water level above the "sand line" of the filter, in the embodiment illustrated being understood to vary as much as two feet in elevation, it being moreover understood that the numerals 24.0, 27.0, et cetera, preceded by El. may be taken to signify units of length, such as feet, corresponding to levels of liquid, the abbreviation "El." signifying an elevation above a predetermined level of elevation, taken as a standard level.

Orifices, $O^3$ and $O^4$, are shown in the vertical branch of the conduit, 8, the discharge from $O^4$ being made into a discharge line, 9, from the filter, this discharge line "feeling" the back pressure of the water level in the clear well, B, when a valve, $V^1$, is open, as is the case when the filter is in operation. The water level in the clear well will be understood to vary between El. 10.0 feet and El. 15.0 feet.

The sand and gravel bed of the filter offers a varying resistance to the flow of water from above the filter bed to the level in the clear well. Thus in such an arrangement we have two varying liquid levels or pressures and a varying resistance between the two varying liquid levels.

The pressure at P' is a simple varying level or pressure but the pressure at P'' is a more complex pressure, being composed of some back pressure from the varying level in the clear well, together with a varying pressure derived from the water level above the filter bed, opposed by the varying resistance of the sand and gravel bed of the filter.

As long as the filter is in normal operation, the valve, $V^1$, is usually only partly open, so that there may also be a certain back pressure due to the restriction of flow resulting from the partly closed valve.

For proper operation of the filter, it is essential to know the difference in pressures existing at P' and P'', the difference between the pressures at these two points being known as "loss of head".

If the level above the filter bed stands at El. 27.0 feet and the level in the clear well stands at El. 15.0 feet, the total available loss of head is 12 feet or the difference in head between the two elevations given.

If the filter bed underdrains, and discharge conduit 9 and valve, V¹ in the conduit 9, offer no resistance to flow, the entire available loss of head of 12 feet would be operative to cause flow from above the filter bed to the level in the clear well. As the filter bed builds up resistance, and as the level above the filter bed decreases and as the level in the clear well increases, the volume of flow from above the filter bed to the clear well will decrease. Any of these may serve to decrease the flow through the filter, while any partial closure of the valve, V¹ will interpose more resistance or vice versa.

In this arrangement, we have two different points of pressure, P' and P", both of which are variable within certain limits. The pressure at P" may equal but it can never exceed that of P'.

A common pressure, that of the level in the tank, 7, is exerted against the approach side of the two orifices, O¹ and O³. The pressure against the discharge sides of the two orifices, O² and O⁴, is neither an equal nor common pressure but two varying pressures. All of these orifices may be of the same size and construction, thus giving each a coefficient of discharge just equal to that of the others.

It is well known that when a flow is made to pass through an orifice, the orifice consumes all of the pressure acting to create flow therethrough, in other words, the head acting to create flow through an orifice is the velocity head of the flow through the orifice. I have discovered that where two or more orifices are placed in series or tandem relative to one another that all the head acting to create flow through the orifices will be split or divided between the number of orifices so employed.

I have discovered that I can utilize such an arrangement of orifices to obtain certain desirable results more economically and certainly than by any other device with which I am familiar.

In the arrangement shown herein, which is merely one useful application, it being obvious that many other equivalent applications may be made, I have herein disclosed a method whereby I can do several desirable things. For instance, it is feasible to measure the variation of level or pressure around P'. It is also feasible to measure the variation of pressure around P". It is equally feasible to measure the difference of pressure at P' and P". Other pressure and pressure absorption relations may be determined.

At X and Y, are two piezometers to read the pressure between orifices O¹ and O² and between O³ and O⁴, respectively. Thus, with the valve, V wide open, and with the level in the tank 7 at El. 47.0 feet and the level above the filter bed at El. 27.0 feet, there is an available head of 20 feet acting to create flow through orifices O¹ and O². The tops of the piezometers X and Y are slightly above El. 37.0 feet, say at El. 37.5 feet.

As there is a total head of only 20 feet acting to create flow, and if the two orifices are of the same size and coefficient of discharge, they must split or divide this head equally between themselves and this means that as 10 feet is lost in passing O¹ and 10 feet in passing O², the piezometer reading will stand at El. 37.0 feet. If the level in A or the tank above the filter bed should then fall to El. 25.00 feet, the head would be 22.0 feet.

This would mean that each orifice would have to absorb 11.0 feet of head and the reading of the piezometer X would show a level of El. 36.0 feet. The difference of level in A is thus shown to be 2.0 feet and the difference in the reading of the piezometer X is seen to be one foot. In other words, a one foot rise or fall of level above the filter bed will be indicated by a 0.5 feet rise or fall of level in the piezometer X. We would therefore, in an arrangement of this kind, graduate the scale of the piezometer in the one half scale, thus obtaining our readings correctly.

Now, if we assume the level in B to stand at El. 15.0 feet, the valve V¹, wide open and no resistance between P' and P", we then have a total head of 32.0 feet available to create flow through orifices O³ and O⁴. Piezometer Y, reading the split of this will show a level of El. 31.0 feet. If thereafter, the level in B should fall to El. 10.0 feet, then there would be a total head of 37.0 feet to create flow through the orifices and the piezometer Y would read El. 28.5 feet. A five foot drop in level in B showing a 2.5 feet drop in piezometer, thus showing a similar result as piezometer X.

Inasmuch as the two piezometers give correct readings of the levels or pressures they are set to read, it is obvious that the difference between the piezometer readings will be the difference between the two levels or pressures existing around P' and P". If the conduit 8 be large enough so that the maximum flow through the orifices will not result in a flow of sufficient velocity to bring about a noticeable friction loss in the conduit 8, all of the loss of head will be caused to occur in the flow passing the orifices.

In this embodiment of my invention, I have shown two pairs of two each of the orifices, with a piezometer take-off from between each pair of orifices, and have shown a flow from a higher source of pressure introduced through such orifices into the levels or pressures to be measured. This arrangement is well adapted to bring about the desired result but it should be obvious that many other applications of the same principle may be utilized for various other requirements.

Although in the embodiment of my invention a liquid system is described and the foregoing description pertains particularly to said liquid system, it will be understood that my invention is not in its broader aspects limited to a system wherein the fluid employed and the pressures thereof are indicated as in liquid form, since in addition to atmospheric pressure, which is the pressure of a gas, and is operative in connection with said described embodiment, the fluid directed through the conduits may be in the form of gas, such as air, and the container from which and/or to which the gas flows may be containers for gas held therein under fluid pressure conditions any one of which it is the function of the invention to indicate. It is to be understood therefore in the claims where liquid levels are referred to that these terms are to be considered broadly as meaning fluid pressures, unless the claims otherwise are limited to the use of liquids. It is very clear to those skilled in the art that the same invention may be applied to gaseous fluids and the invention therefore is not limited to the use of a liquid. Also in the claims and in the foregoing specification wherein I employ the terms "duct", "conduit", "pipes" or the like, it will be understood that in all such cases like or equivalent means for conducting a fluid described and claimed are contemplated thereby and that the terms are interchangeable, as is well known to those skilled in the art and are herein so employed to mean any means whereby fluid in motion is directed in its line of flow.

In the embodiment of my invention, as shown herein, if the only thing desired were to read the difference of pressures around the points P' and P'', a manometer might be employed in place of the two piezometers shown. In such a case, the manometer leads would be taken from the same points as the piezometer leads shown in this embodiment.

Referring now specifically to Fig. 2, I illustrate diagrammatically therein a pair of conduits A' and B', adapted to conduct fluid flows indicated diagrammatically by the arrows $a$ and $b$, respectively, and at S' I indicate a source of fluid pressure adapted to supply fluid through a conduit 8, the flow through which may be controlled by a pressure-limiting valve V', to the conduits A' and B'.

It will be understood that since the intent of the system shown is to accurately indicate pressures arising from the flows in conduits A' and B', the amount of fluid contributed to the conduits from the source S' will preferably be a negligible amount of fluid.

At the same time, however, the pressure at which fluid is delivered from the source S' to the conduits A' and B' should be in excess of pressure contained in these conduits so that there should preferably be a flow in the direction from the source S' to the conduits at all times.

At M, I show a manometer comprising a U-tube having a body of mercury disposed at its depending loop, the arms of which, X' and Y', communicate at their extremities with branches of the conduit 8 in portions between a plurality of orifices interposed in each of said branches, these orifices for the arm Y' and branch leading to conduit B' being indicated at $O^{31}$ and $O^{41}$, and for the arm X' and the branch leading to the conduit A', at $O^{11}$ and $O^{21}$.

The level of the mercury in either of the arms X' and Y' may be used to indicate the proper scale divisions indicating such level, such as indicated by the numerals 0, 10, 20 and 30, in Fig. 2, the differences in pressure existing in the conduits A' and B'.

In the embodiment of Fig. 2 there is illustrated the use of a manometer which may be substituted for the piezometers X and Y, of Fig. 1.

The conduits A' and B' may be either separate conduits or different portions of the same fluid system, such as branches or continuations of the same conduit whereat different fluid pressures may be expected to arise. It will be understood that where the same pressures are had in the conduits, the mercury level in the manometer arms will be the same, and that where the pressure in one of the conduits is in excess of that in the other conduit, the level of the mercury will vary in the two arms of the manometer, and that this variation may be indicated by reference to the scale divisions applied adjacent to the manometer arms, or either of them.

It will be observed that the embodiment system of Fig. 2 is a replica of Fig. 1, except that a manometer is illustrated for the embodiment of Fig. 2, and the system is therefore adapted for the ready indication of fluid pressures which may be gaseous pressures and, in which case, the fluids employed will preferably, in each case, be gaseous, although this is by no means essential to the working of the system. The operation of the device will be readily understood by reference to the more lengthy description previously given with reference to the operation of the system of Fig. 1.

I contemplate herein also the method of operating the system under conditions wherein the direction of flows will be reversed, that is, as illustrated in Fig. 2, wherein the pressure of fluid in the source S' is less than the pressures existing in the conduits A' and B'. The mode of operation in such a case would be the same and the results secured would be the same and accomplished in like manner.

Having thus described my invention in a plurality of embodiments, I am aware that numerous and extensive departures may be made from the embodiments herein illustrated and described, but without departing from the spirit of my invention.

Having thus described my invention, what I claim is:

1. In a fluid system in combination with a fluid conduit, means for determining pressure at a point therein comprising a duct communicating at one end with the conduit at such point, said duct being provided with serially related orifices accumulatively adapted to restrict the amount of flow occurring through the duct, the relative pressure absorption effected by the orifices being predetermined by their sizes, and means for effecting a datum fluid pressure in the duct on a side of the most remote of two orifices relative to the conduit, a pressure indicator means to differentially indicate the values of two different fluid pressures existing at different points of said conduit disposed so as to respond to the fluid pressure existing between said remote and said other orifice.

2. Apparatus for determining an unknown pressure of fluid at a given point in a conduit comprising a duct for establishing a minor fluid flow at said point to a container whose pressure is constantly substantially of a different known value, means associated with the duct for successively restricting the flow of fluid at successive points of minor fluid flow, and means for correlatively measuring said known pressure and pressure of fluid at points in the minor fluid flow intermediate the points of restriction.

3. In a fluid system, a fluid conduit containing flowing fluid wherein at a point in the conduit the pressure of the fluid is maintained at a determinable pressure value, a second conduit containing fluid flowing therethrough which in at least one point therein is variable in pressure, a duct interconnecting the conduits, the duct being provided with restricting perforated partitions serially disposed therein, and indicating means for indicating the pressure of fluid between the partitions.

4. In a fluid system, a pair of communicating fluid conduits, containing fluid, the fluid in one of which is maintained at a determinable pressure value, a duct communicating with said one of said conduits, the other of said conduits and the duct each being provided with a pair of fluid flow restricting perforated partitions serially disposed therein, and means for correlatively indicating the fluid pressures existing simultaneously between the pairs of partitions whereby the relation of the fluid pressure in the partitions to the determinable pressure value may be found.

5. Apparatus for determining the relative fluid pressure in a fluid system, of a point in the system of known fluid pressure and a point in the system of unknown variable fluid pressure, one pressure being greater than the other, comprising a conduit for establishing a minor fluid flow from the point of higher pressure to the point of lower pressure, means associated with the conduit for constricting said minor flow at a plurality of points in its path of travel whereby an intermediate pressure is created, which is a function of both said fluid pressures and means for measuring said intermediate pressure.

6. In a fluid system, apparatus for indicating the value of a variable pressure of the fluid in one portion of the system compared with a known pressure in another portion of the system, one such pressure being greater than the other comprising a conduit for establishing a minor fluid flow from the point of higher pressure to the point of lower pressure, means associated with the conduit for constricting said minor flow at a plurality of points in its path of travel whereby an intermediate pressure is created between any two such points, which pressure is a function of both the known and variable pressures, and means for measuring said intermediate pressure.

7. In a fluid system, a conduit for the fluid having therein a pair of serially spaced constrictions, means for connecting the conduit at one side of the pair of constrictions to fluid of variable pressure, means for connecting the conduit at the other side of the constrictions to a fluid supply having a known datum pressure and means for indicating the value of the variable fluid pressure including means to indicate the pressure in the conduit intermediate the constrictions.

8. Apparatus for indicating the value of a variable fluid pressure in a conduit system compared with a known fluid pressure in the system, comprising a conduit for establishing a minor fluid flow from the point of higher pressure to the point of lower pressure, means associated with the conduit for constricting said minor flow at a plurality of points in its path of travel thereby effecting between a pair of the constrictions an intermediate variable pressure different from the said known and said variable pressures, which intermediate variable pressure is a function of both the known and variable pressures, means for measuring the intermediate variable pressure.

9. In a fluid system, a pair of fluid ducts, each duct being provided with a plurality of serially related constrictions therein, a pair of containers for fluid, said ducts communicating fluid from one of said containers to the other container, one of said containers containing fluid at an ascertainable pressure value, the pressure of fluid in the other container being unknown, and indicating means for simultaneously indicating the value of pressure between the pair of constrictions of each duct.

10. In a fluid system, in combination a pair of containers for containing fluid under differing pressure, a source of minor fluid flow under known pressure, a conduit leading therefrom, branches of the said conduit leading to each said container, there being a plurality of orifices of known area in each said branch, and a fluid pressure indicating means communicating with each of the said conduit branches at points intermediate a pair of orifices in each said branch.

11. Apparatus for measuring the height of a plurality of liquid levels at a common point remote from the said levels, comprising means for establishing at the common point a common predetermined pressure and a plurality of fluid flows each adapted to discharge into a different one of said liquids at or below the surface thereof, means adapted to continuously restrict the flows at definite points, and means for measuring the relative difference in pressure between restricted points of each of the fluid flows to indicate the relative difference in height of the various liquid levels.

12. In a fluid system, the combination of a main conduit adapted to supply a fluid at a given pressure provided with a plurality of branch conduits having each a first orifice and a second orifice spaced therefrom through which fluid from the said conduit may pass, a plurality of liquid containers containing liquid at the same or different levels communicating with said plurality of branch conduits respectively at points more remote from the main conduit than the orifices, and fluid pressure indicating means adapted to measure the pressure in the conduits at points intermediate the said first and second orifices.

13. In a fluid system, the combination of a main conduit adapted to supply a fluid at a given pressure and provided with a plurality of branch conduits having each a first orifice and a second orifice spaced therefrom through which fluid from the said conduit may pass, a plurality of liquid containers containing liquid at the same or different levels in communication with the said plurality of branch conduits respectively, fluid pressure indicating means adapted to measure the pressure in the branch conduits at points intermediate the first and second said orifices, the branch conduits containing the said orifices being of substantially negligible resistance to fluid flow relative to the resistance offered by the said orifices.

14. In a fluid system, in combination, a plurality of containers containing fluid at the same or different pressures, a plurality of conduit means adapted to establish communication between each container and a common body of fluid under predetermined pressure, a plurality of orifices in each conduit means, and there being manometer tubes connected to each of said conduit means between its said orifices.

15. In a fluid system, a fluid container for a fluid under pressure, a conduit communicating with the fluid container and adapted to communicate a minor flow of fluid under predetermined pressure to the fluid in the container under pressure, means having a plurality of orifices in the said conduit, and a pressure indicating apparatus to indicate the pressure intermediate of a pair of said orifices to indicate the pressure of fluid in the said container.

16. Apparatus for indicating the pressure of a fluid under pressure comprising means for maintaining a minor flow of fluid to the fluid under predetermined pressure, means for continuously restricting the flow at definite successive points to a definite amount, and means for measuring the degree of pressure taken from the minor flow intermediate points of restriction to indicate such fluid pressure.

CHARLES ARTHUR BROWN.